United States Patent Office 3,557,088
Patented Jan. 19, 1971

3,557,088
POLYPHENYL 1,2-DIAZEPINES
Erwin Klingsberg, Mountainside, N.J., assignor to American Cyanamid Company, Stamford, Conn., a corporation of Maine
No Drawing. Continuation-in-part of application Ser. No. 541,065, Apr. 8, 1965. This application Sept. 25, 1968, Ser. No. 762,651
Int. Cl. C07d 53/02
U.S. Cl. 260—239                             3 Claims

ABSTRACT OF THE DISCLOSURE 1,2 - diazepines which have a phenyl group in the 3, 5, and 7 positions and optionally methyl or phenyl in the 1-position are prepared from a 2,4,6-triphenylthiapyrylium salt such as the perchlorate or fluoborate, by reaction with an excess of hydrazine, methylhydrazine or phenylhydrazine, the excess of hydrazine serving as solvent. By this method there are prepared 3,5,7-triphenyl- and 5 - (p - dimethylaminophenyl) - 3,7 - diphenyl-4H-1,2 - diazepines and 1 - methyl - 3,5,7 - triphenyl - 1H-1,2-diazepine. All the compounds when protonated are useful in dyeing fibers having anionic sites. The 1H compounds exhibit bactericidal activity and the 4H compounds exhibit vasodepressor activity.

---

This application is a continuation-in-part of application Ser. No. 541,065, filed Apr. 8, 1966, now abandoned.

This invention relates to a process for preparing a seven-membered ring compound having two adjacent hetero nitrogen atoms from a six-membered ring compound having a single hetero sulfonium atom and to the resultant compounds which have biological activity and other useful properties.

More specifically, the compounds of this invention are 1H and 4H 1,2-diazepines substituted in the 3, 5, and 7-positions by phenyl or substituted phenyl radicals; the 1H diazepines being substituted in the 1-position by a lower alkyl, phenyl, lower alkyl-substituted phenyl or phenyl-substituted lower alkyl group. The ring systems for these compounds are shown in The Ring Index, 2nd edition, Nos. 343 and 345, respectively.

In accordance with the process of the invention the aforesaid compounds are prepared by reacting a 2,4,6-triarylthiapyrylium salt with hydrazine ($NH_2NH_2$) or a liquid mono-substituted hydrazine ($RNHNH_2$) as shown by reactions I and II, below, wherein Ph represents a phenyl radical or a phenyl radical which is substituted by a halogen, a lower ($C_1$–$C_6$) alkyl, a lower alkoxy or a lower dialkylamino group, R represents a lower alkyl group and $X^-$ is an anion.

(I)

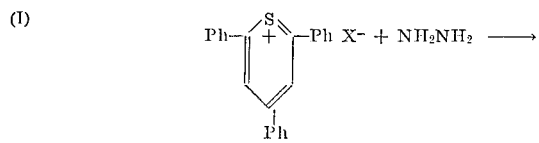

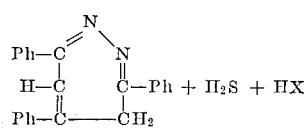

4H-(3,5,7-triphenyl)-1,2-diazepine (II)

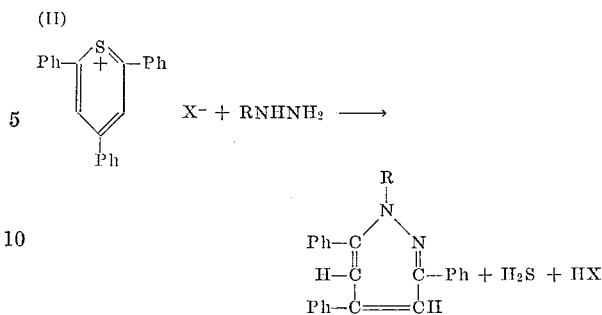

1H-(3,5,7-triphenyl)-1,2-diazepine

The 1,2-diazepines of this invention are distinguished from known 1,4-diazepines in that they have entirely different ring systems and different properties. Thus, they differ from the 1,4-diazepines as much as a pyrazole differs from an imidazole or a pyridazine differs from a pyrazine. Also, the synthesis of the 1,2-diazepines is entirely different from that of the 1,4-diazepines.

Furthermore, the 1,2-diazepines of this invention are distinguished from the known hydrogenated 1,2-diazepines by their aromaticity, whereby they exhibit dyeing properties not present in the latter.

Triarylthiapyrylium salts useful as starting materials in the invention are described by Wizinger and Ulrich, Helv. Chim. Acta 39 207 (1956). Typical of these salts are the following: 2,4,6 - triphenylthiapyrylium perchlorate, 4 - anisyl - 2,6 - diphenylthiapyrylium perchlorate, 2 - anisyl - 4,6 - diphenylthiapyrylium perchlorate, 2,4,6-trianisylthiapyrylium perchlorate, 4-dimethylaminophenyl-2,6 - diphenylthiapyrylium perchlorate and 2 - dimethylaminophenyl - 4,6 - diphenylthiapyrylium perchlorate. The phenyl groups may be further substituted by halo or lower alkyl groups. Salts other than perchlorates may be used, including bromides, iodides and fluoborates.

Hydrazine (including hydrazine hydrate) and monosubstituted normally liquid hydrazine compounds may be used in the process of the invention. Thus, lower alkyl ($C_1$–$C_6$) hydrazines may be used. An excess of the hydrazine compound may be utilized as solvent for the reaction.

The reaction takes place readily at room temperature, the polyphenyl-1,2-diazepine product being formed in good yield and quality. It may be recrystallized from solvents such as ethanol, methylcyclohexane or methoxyethanol.

The 4H-polyphenyl-1,2-diazepines of the invention (Equation I supra) have vasodepressor action as indicated by a standard antihypertensive screening test. In this test (detailed further in Example 3 hereinafter) phenethylamine is administered to rats which have been previously dosed with the test compound. The phenethylamine evokes a rise in blood pressures indirectly by causing the release of norepinephrine. A test compound which has vasodepressor activity will markedly depress the normal phenethylamine response. The compounds exhibiting this activity, such as the compounds of Equation I herein, after further testing may then be compounded with known pharmaceutically acceptable ingredients and employed as blood pressure depressants.

The compounds of both Equation I and Equation II, such as the compounds of Examples 1, 2 and 4 hereinafter, are also useful as dyes on fibers having anionic sites, such as polyester and polyacrylonitrile fibers, when the compounds have been protonated (made cationic) in acid solution. Protonation occurs under the usual conditions of dyeing. Moreover the dyeings are fluorescent. A manner of use of these compounds as dyes is described in "Dyeing and Finishing Blends of Dacron Polyester Fibers and Cellulose Fibers," American Dyestuff Reporter, May 4, 1959, pages 41–45, and in U.S. Pat. 3,264,325.

The 1H compounds of the invention (Equation II supra) exhibit bactericidal activity. For example, the compounds kill *A. aerogenes, S. aureus* and *X. vesicatoria* when used in aqueous solution at 100 p.p.m. The first of these bacteria is a common inhabitant of soils and water and are present in the slime often encountered in paper mills. The compounds of Equation II are therefore useful in controlling paper mill slime. The second of the bacteria is common on the skins of man and animals and some strains are pathogenic. The compounds of Equation II may be used to control these bacteria on these or other substrates. The third bacterium is the pathogen that incites bacteriosis of tomatoes and peppers. The compounds of Equation II therefore are useful in controlling this condition.

The following examples illustrate this invention.

EXAMPLE 1

Preparation of 3,5,7-triphenyl-4H-1,2-diazepine

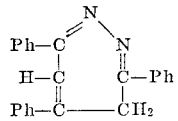

Two hundred ml. of 100% hydrazine hydrate is stirred at room temperature while 20.0 g. (0.048 mole) of 2,4,6-triphenylthiapyrylium perchlorate is sifted in during one-half hour. Stirring is continued until the reaction is complete. The product is filtered, washed with water and dried. Crystallization from 800 ml. methylcyclohexane with the aid of activated charcoal gives 9.0 g. pale yellow product, M.P. 186–190° C.

A specimen purified for analysis by successive crystallization from butanol, acetonitrile and methylcyclohexane, is white, M.P. 193–5° C.

*Analysis.*—Calcd. for $C_{23}H_{18}N_2$ (percent): C, 85.7; H, 5.6; N, 8.7. Found (percent): C, 85.5; H, 5.6; N, 8.8.

EXAMPLE 2

Preparation of 5-(p-dimethylaminophenyl)-3,7-diphenyl-4H-1,2-diazepine

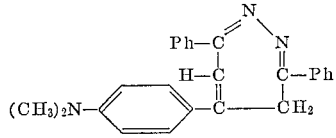

Ten grams (0.021 mole) of 4-(dimethylaminophenyl)-2,6-diphenylthiapyrylium perchlorate is sifted with stirring into 100 ml. hydrazine hydrate during one-half hour at room temperature. The mixture is stirred until the reaction is complete. The product is filtered, washed, extracted with 800 ml. boiling water, filtered and dried. Crystallization from 150 ml. methoxyethanol, with the aid of activated charcoal, gives 5.7 g. yellow needles, M.P. 218–220° C. Further crystallization from ethanol does not give a significant change in melting point. Analysis of the product recrystallized from ethanol:

Calcd. for $C_{25}H_{23}N_3$ (percent): C, 82.2; H, 6.3; N, 11.5. Found (percent): C, 81.9; H, 6.5; N, 11.5.

EXAMPLE 3

The compounds of Examples 1 and 2 were tested for vasodepressor activity as follows:

Each of the compounds was suspended in a 2% starch solution and given to rats by gavage at a dose of 100 mg. per kg. of body weight. The rats were of the Wistar strain and weighed about 250 g. Two animals per compound were used. Following dosing, the rats were placed in a supine position on a board. Using a local anesthetic, the animals' femoral veins and arteries were exposed and cannulated. Two hours after dosing, blood pressure was recorded on a multichannel recorder by means of a strain gauge pressure transducer. Phenethylamine was then injected intravenously, 1 mg. per kg. of body weight. Each compound provided a pharmacologically and statistically significant reduction from control in the phenethylamine response. The control response was the average response in more than 300 rats dosed with 2% starch which received an injection of 1 mg./kg. of phenethylamine.

EXAMPLE 4

Preparation of 1-methyl-3,5,7-triphenyl-1H-1,2-diazepine

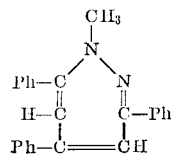

To 36 ml. of methylhydrazine is added with stirring at room temperature, 4.0 g. (9.7 millimoles) 2,4,6-triphenylthiapyrylium fluoborate. The mixture is stirred until the reaction is complete. The product is filtered, washed with water and dried. The crude product weighs 2.0 g. and melts at 117–19° C. Recrystallization from ethanol or methylcyclohexane gives orange crystals, M.P. 120–121° C.

*Analysis.*—Calcd. for $C_{24}H_{20}N_2$ (percent): C, 85.7; H, 6.0; N, 8.3. Found (percent): C, 85.6; H, 6.1; N, 8.2.

EXAMPLE 5

The compound of Example 4 was tested for bactericidal activity as follows:

The test procedure is a modified broth culture, with the test organisms exposed to an aqueous solution of the test chemical for 24 hours prior to adding dextrose-peptone broth. This allows measurement of antibacterial activity in the absence of a broth that could interfere with a chemical's activity. The assay bacteria are *Aerobacter aerogenes* (gram negative), *Staphylococcus aureus* (gram positive) and *Xanthomonas vesicatoria* (gram negative).

Three test tubes are required for each compound in the first stage of bactericide evaluation. Nine ml. of deionized water is pipetted into each tube and the tubes are capped and sterilized. For each test compound, 1 ml. of the stock solution is pipetted into each tube, resulting in a test concentration of 100 p.p.m. One drop of a bacterial cell suspesion is then added to the appropriate tubes. The bacterial cell suspensions are from 24-hour broth (0.1% dextrose-1% peptone) cultures that were inoculated with bacteria from 7-day Nutrient Agar slants. After an exposure period of 24 hours, 1 ml. of 1% dextrose-10% peptone broth is pipetted aseptically into each tube. The tubes are then incubated for 24 hours at 37° C. and then presence or absence of growth is determined by turbidity readings. Tubes with no bacterial growth are subcultured to determine if the bacteria have been killed.

It was observed that the compound had killed the bacteria in each instance.

EXAMPLE 6

Application to synthetic fibers having anionic sites

The test procedure was as follows:

25 mg. of the compound is dissolved in 2 ml. of acetone. This solution is added to a mixture of 50 ml. of water and 1 ml. of a 5% solution of lauryl sodium sulfate. The whole is made up to 200 ml. with water.

A five gram skein made of a polyester known as Type 64 "Dacron" polyester fiber is introduced and the bath heated to 150° F. To it is added 3 ml. of a 48% methyl salicylate emulsion, used as a carrier. The whole is heated to 205° F. over 20–30 minutes and then dyed at 205° F. for one hour. The dyed polyester is removed and rinsed in hot water. It is soaped for ten minutes at the boil in a 0.1% solution of neutral soap. The dyed skein or fabric is then rinsed with water and dried. Hue and appearance of the skein under ultraviolet light are as given below.

| Compound | Hue of dyeing | Appearance under ultraviolet light |
|---|---|---|
| Example: | | |
| 1 | Yellow | White fluorescence. |
| 2 | Blue-red | Red-orange fluorescence. |
| 4 | Yellow | White fluorescence. |

When other synthetic fibers having anionic sites are substituted for the polyester in the above procedure, such as fibers derived from polyacrylonitrile, a similar result in both hue and fluorescence is obtained.

I claim:
1. A compound of the formula

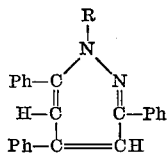

where Ph represents phenyl, halophenyl, lower alkylphenyl, lower alkoxyphenyl or lower dialkylaminophenyl and R represents lower alkyl.

2. The compound of claim 1 which is

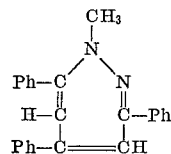

where Ph represents phenyl.

3. A process for preparing the compound of claim 1 which comprises reacting a compound of the formula

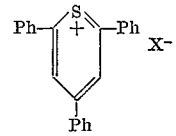

with a compound of the formula $$RNHNH_2$$

wherein Ph and R are as defined in claim 1 and X⁻ is an anion.

References Cited

Klingsberg: American Chemical Society Abstracts of Papers, 150th Meeting, 1965, p. 665.

Dorland's Illustrated Medical Dictionary (24th ed., Philadelphia and London, 1965), pp. 1216 and 1667–1668.

ALTON D. ROLLINS, Primary Examiner

U.S. Cl. X.R.

8—177, 179; 252—301.2; 260—327; 424—244